United States Patent
Boardman et al.

(10) Patent No.: US 11,156,360 B2
(45) Date of Patent: Oct. 26, 2021

(54) FUEL NOZZLE ASSEMBLY

(71) Applicant: General Electric Company, Schenectady, NY (US)

(72) Inventors: Gregory Allen Boardman, Liberty Township, OH (US); Michael Anthony Benjamin, Cincinnati, OH (US); Pradeep Naik, Bangalore (IN); Vishal Sanjay Kediya, Akot (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 492 days.

(21) Appl. No.: 16/278,341

(22) Filed: Feb. 18, 2019

(65) Prior Publication Data

US 2020/0263873 A1 Aug. 20, 2020

(51) Int. Cl.
*F23R 3/00* (2006.01)
*F23R 3/28* (2006.01)
*F02C 7/22* (2006.01)

(52) U.S. Cl.
CPC ............... *F23R 3/286* (2013.01); *F02C 7/22* (2013.01)

(58) Field of Classification Search
CPC .. F23R 3/286; F23R 3/34; F23R 3/343; F02C 7/22
See application file for complete search history.

(56) References Cited

U.S. PATENT DOCUMENTS 2,565,843 A 8/1951 Dennison
3,917,173 A 11/1975 Singh
(Continued)

FOREIGN PATENT DOCUMENTS

| EP | 1391653 A2 | 2/2004 |
|---|---|---|
| WO | WO2008/071902 A1 | 6/2008 |
| WO | 2018/082539 A1 | 5/2018 |

OTHER PUBLICATIONS

U.S. Appl. No. 15/909,211, filed Mar. 1, 2018.
(Continued)

*Primary Examiner* — Katheryn A Malatek
(74) *Attorney, Agent, or Firm* — Venable LLP; Edward A. Kmett; Michele V. Frank

(57) ABSTRACT

A fuel nozzle for a gas turbine engine is generally provided. The fuel nozzle includes an outer sleeve extended circumferentially around a fuel nozzle centerline and extended along a longitudinal direction co-directional to the fuel nozzle centerline. The outer sleeve defines a plurality of first radially oriented air inlet ports through the outer sleeve in circumferential arrangement relative to the fuel nozzle centerline. A centerbody is positioned radially inward of the outer sleeve. The centerbody includes an outer annular wall extended circumferentially around the fuel nozzle centerline and extended along the longitudinal direction co-directional to the fuel nozzle centerline. The outer sleeve further includes a first radial wall extended from a downstream end of the outer annular wall. The centerbody defines a plenum radially inward thereof. The outer annular wall and the outer sleeve together define a first fuel air mixing passage extended along the longitudinal direction therebetween. A fuel injector is disposed in the plenum. The fuel injector includes a tubular outer wall extended co-directional to the fuel nozzle centerline. The outer wall defines a second fuel air mixing passage therewithin. The second fuel air mixing passage is extended through the first radial wall of the centerbody.

22 Claims, 10 Drawing Sheets

(56) References Cited

U.S. PATENT DOCUMENTS

| | | |
|---|---|---|
| 3,946,552 A | 3/1976 | Weinstein et al. |
| 3,972,182 A | 8/1976 | Salvi |
| 3,980,233 A | 9/1976 | Simmons et al. |
| 4,100,733 A | 7/1978 | Striebel et al. |
| 4,177,637 A | 12/1979 | Pask |
| 4,215,535 A | 8/1980 | Lewis |
| 4,222,232 A | 9/1980 | Robinson |
| 4,226,083 A | 10/1980 | Lewis et al. |
| 4,262,482 A | 4/1981 | Roffe et al. |
| 4,408,461 A | 10/1983 | Bruhwiler et al. |
| 4,412,414 A | 11/1983 | Novick et al. |
| 4,689,961 A | 9/1987 | Stratton |
| 4,763,481 A | 8/1988 | Cannon |
| 4,967,561 A | 11/1990 | Bruhwiler et al. |
| 5,121,597 A | 6/1992 | Urushidani et al. |
| 5,207,064 A | 5/1993 | Ciokajlo et al. |
| 5,211,675 A | 5/1993 | Bardey et al. |
| 5,235,814 A | 8/1993 | Leonard |
| 5,251,447 A | 10/1993 | Joshi et al. |
| 5,263,325 A | 11/1993 | McVey et al. |
| 5,265,409 A | 11/1993 | Smith, Jr. et al. |
| 5,307,634 A | 5/1994 | Hu |
| 5,339,635 A | 8/1994 | Iwai et al. |
| 5,351,477 A | 10/1994 | Joshi et al. |
| 5,373,693 A | 12/1994 | Zarzalis et al. |
| 5,511,375 A | 4/1996 | Joshi et al. |
| 5,592,821 A | 1/1997 | Alary et al. |
| 5,619,855 A | 4/1997 | Burrus |
| 5,622,054 A | 4/1997 | Tingle |
| 5,791,137 A | 8/1998 | Evans et al. |
| 5,816,049 A | 10/1998 | Joshi |
| 5,829,967 A | 11/1998 | Chyou |
| 5,839,283 A | 11/1998 | Dobbeling |
| 5,862,668 A | 1/1999 | Richardson |
| 5,881,756 A | 3/1999 | Abbasi et al. |
| 5,937,653 A | 8/1999 | Alary et al. |
| 6,016,658 A | 1/2000 | Willis et al. |
| 6,038,861 A | 3/2000 | Amos et al. |
| 6,272,840 B1 | 8/2001 | Crocker et al. |
| 6,286,298 B1 | 9/2001 | Burrus et al. |
| 6,295,801 B1 | 10/2001 | Burrus et al. |
| 6,331,109 B1 | 12/2001 | Paikert et al. |
| 6,367,262 B1 | 4/2002 | Mongia et al. |
| 6,442,939 B1 | 9/2002 | Stuttaford et al. |
| 6,460,339 B2 | 10/2002 | Nishida et al. |
| 6,539,721 B2 | 4/2003 | Oikawa et al. |
| 6,539,724 B2 | 4/2003 | Cornwell et al. |
| 6,543,235 B1 | 4/2003 | Crocker et al. |
| 6,564,555 B2 | 5/2003 | Rice et al. |
| 6,594,999 B2 | 7/2003 | Mandai et al. |
| 6,598,584 B2 | 7/2003 | Beck et al. |
| 6,609,376 B2 | 8/2003 | Rokke |
| 6,662,564 B2 | 12/2003 | Bruck et al. |
| 6,742,338 B2 | 6/2004 | Tanaka et al. |
| 6,772,594 B2 | 8/2004 | Nishida et al. |
| 6,837,050 B2 | 1/2005 | Mandai et al. |
| 6,837,051 B2 | 1/2005 | Mandai et al. |
| 6,915,637 B2 | 7/2005 | Nishida et al. |
| 6,962,055 B2 | 11/2005 | Chen et al. |
| 7,036,482 B2 | 5/2006 | Beck et al. |
| 7,093,445 B2 | 8/2006 | Corr, II et al. |
| 7,107,772 B2 | 9/2006 | Chen et al. |
| 7,117,677 B2 | 10/2006 | Inoue et al. |
| 7,188,476 B2 | 3/2007 | Inoue et al. |
| 7,200,998 B2 | 4/2007 | Inoue et al. |
| 7,284,378 B2 | 10/2007 | Amond, III et al. |
| 7,313,919 B2 | 1/2008 | Inoue et al. |
| 7,343,745 B2 | 3/2008 | Inoue et al. |
| 7,360,363 B2 | 4/2008 | Mandai et al. |
| 7,434,401 B2 | 10/2008 | Hayashi |
| 7,469,544 B2 | 12/2008 | Farhangi |
| 7,516,607 B2 | 4/2009 | Farhangi et al. |
| 7,546,740 B2 | 6/2009 | Chen et al. |
| 7,565,803 B2 | 7/2009 | Li et al. |
| 7,610,759 B2 | 11/2009 | Yoshida et al. |
| 7,677,026 B2 | 3/2010 | Conete et al. |
| 7,762,074 B2 | 7/2010 | Bland et al. |
| 7,770,397 B2 | 8/2010 | Patel et al. |
| 7,788,929 B2 | 9/2010 | Biebel et al. |
| 7,810,333 B2 | 10/2010 | Kraemer et al. |
| 7,841,180 B2 | 11/2010 | Kraemer et al. |
| 7,871,262 B2 | 1/2011 | Carroni et al. |
| 7,966,801 B2 | 6/2011 | Umeh et al. |
| 8,033,112 B2 | 10/2011 | Milsavljevic et al. |
| 8,033,821 B2 | 10/2011 | Eroglu |
| 8,057,224 B2 | 11/2011 | Knoepfel |
| 8,161,751 B2 | 4/2012 | Hall |
| 8,225,591 B2 | 7/2012 | Johnson et al. |
| 8,225,613 B2 | 7/2012 | Sisco et al. |
| 8,234,871 B2 | 8/2012 | Davis, Jr. et al. |
| 8,276,385 B2 | 10/2012 | Zuo et al. |
| 8,316,644 B2 | 11/2012 | Wilbraham |
| 8,322,143 B2 | 12/2012 | Uhm et al. |
| 8,327,643 B2 | 12/2012 | Yamamoto et al. |
| 8,347,630 B2 | 1/2013 | Lovett et al. |
| 8,375,721 B2 | 2/2013 | Wilbraham |
| 8,424,311 B2 | 4/2013 | York et al. |
| 8,438,851 B1 | 5/2013 | Uhm et al. |
| 8,511,087 B2 | 8/2013 | Fox et al. |
| 8,528,337 B2 | 9/2013 | Berry et al. |
| 8,539,773 B2 | 9/2013 | Ziminsky et al. |
| 8,550,809 B2 | 10/2013 | Uhm et al. |
| 8,590,311 B2 | 11/2013 | Parsania et al. |
| 8,621,870 B2 | 1/2014 | Carroni et al. |
| 8,671,691 B2 | 3/2014 | Boardman et al. |
| 8,683,804 B2 | 4/2014 | Boardman et al. |
| 8,701,417 B2 | 4/2014 | Nicholls et al. |
| 8,752,386 B2 | 6/2014 | Fox et al. |
| 8,850,820 B2 | 10/2014 | Milsavljevic et al. |
| 8,863,524 B2 | 10/2014 | Karlsson et al. |
| 8,938,971 B2 | 1/2015 | Poyyapakkam et al. |
| 8,943,835 B2 | 2/2015 | Corsmeier et al. |
| 9,091,444 B2 | 7/2015 | Turrini et al. |
| 9,134,023 B2 | 9/2015 | Boardman et al. |
| 9,182,123 B2 | 11/2015 | Boardman et al. |
| 9,335,050 B2 | 5/2016 | Cunha et al. |
| 9,377,192 B2 | 6/2016 | Hirata et al. |
| 9,388,985 B2 | 7/2016 | Wu et al. |
| 9,416,973 B2 | 8/2016 | Melton et al. |
| 9,423,134 B2* | 8/2016 | Woods .............. F23R 3/283 |
| 9,423,137 B2 | 8/2016 | Nickolaus |
| 9,534,781 B2 | 1/2017 | Hughes et al. |
| 9,759,426 B2 | 9/2017 | Johnson et al. |
| 9,810,152 B2 | 11/2017 | Genin et al. |
| 9,822,981 B2 | 11/2017 | Ciani et al. |
| 9,835,333 B2 | 12/2017 | Antoniono et al. |
| 2002/0083711 A1 | 7/2002 | Dean et al. |
| 2003/0101729 A1 | 6/2003 | Srinivasan |
| 2006/0021350 A1 | 2/2006 | Sanders |
| 2007/0099142 A1 | 5/2007 | Flohr et al. |
| 2007/0227148 A1 | 10/2007 | Bland et al. |
| 2007/0259076 A1 | 11/2007 | Knoepfel |
| 2008/0083229 A1 | 4/2008 | Haynes et al. |
| 2008/0236165 A1* | 10/2008 | Baudoin ............ F23R 3/343 60/746 |
| 2008/0280239 A1 | 11/2008 | Carroni et al. |
| 2009/0056338 A1 | 3/2009 | Cazalens et al. |
| 2009/0173075 A1 | 7/2009 | Miura et al. |
| 2009/0173076 A1 | 7/2009 | Toon |
| 2009/0293484 A1 | 12/2009 | Inoue et al. |
| 2010/0050644 A1 | 3/2010 | Pidcock et al. |
| 2010/0083663 A1 | 4/2010 | Fernandes et al. |
| 2010/0186412 A1 | 7/2010 | Stevenson et al. |
| 2010/0236247 A1 | 9/2010 | Davis, Jr. et al. |
| 2010/0275601 A1 | 11/2010 | Berry et al. |
| 2011/0000215 A1 | 1/2011 | Lacy et al. |
| 2011/0016866 A1 | 1/2011 | Boardman et al. |
| 2011/0016871 A1 | 1/2011 | Kraemer et al. |
| 2011/0083439 A1 | 4/2011 | Zuo et al. |
| 2011/0252803 A1 | 10/2011 | Subramanian et al. |
| 2011/0265482 A1 | 11/2011 | Parsania et al. |
| 2011/0289933 A1 | 12/2011 | Boardman et al. |
| 2012/0096866 A1 | 4/2012 | Khan et al. |
| 2012/0131923 A1 | 5/2012 | ElKady et al. |

(56) References Cited

U.S. PATENT DOCUMENTS

| | | |
|---|---|---|
| 2012/0258409 A1 | 10/2012 | Mansour et al. |
| 2012/0279223 A1 | 11/2012 | Barker et al. |
| 2012/0285173 A1 | 11/2012 | Poyyapakkam et al. |
| 2012/0292408 A1 | 11/2012 | Short |
| 2013/0042625 A1 | 2/2013 | Barker et al. |
| 2013/0046625 A1 | 2/2013 | Grigg et al. |
| 2013/0067920 A1 | 3/2013 | Fox et al. |
| 2013/0074510 A1 | 3/2013 | Berry |
| 2013/0101729 A1 | 4/2013 | Keremes et al. |
| 2013/0101943 A1 | 4/2013 | Uhm et al. |
| 2013/0177858 A1 | 7/2013 | Boardman et al. |
| 2013/0199188 A1 | 8/2013 | Boardman et al. |
| 2013/0239581 A1 | 9/2013 | Johnson et al. |
| 2013/0318977 A1 | 12/2013 | Berry et al. |
| 2013/0336759 A1 | 12/2013 | Christians |
| 2014/0033718 A1 | 2/2014 | Manoharan et al. |
| 2014/0053571 A1 | 2/2014 | Keener et al. |
| 2014/0060060 A1 | 3/2014 | Bernero et al. |
| 2014/0090400 A1 | 4/2014 | Stuttaford et al. |
| 2014/0096502 A1 | 4/2014 | Karlsson et al. |
| 2014/0290258 A1 | 10/2014 | Gerendas et al. |
| 2015/0076251 A1 | 3/2015 | Berry |
| 2015/0128607 A1 | 5/2015 | Lee |
| 2015/0159875 A1 | 6/2015 | Berry et al. |
| 2015/0241065 A1 | 8/2015 | Hughes |
| 2016/0010856 A1 | 1/2016 | Biagioli et al. |
| 2016/0061452 A1 | 3/2016 | Walker et al. |
| 2016/0169110 A1 | 6/2016 | Myers et al. |
| 2016/0209036 A1 | 7/2016 | Cheung |
| 2016/0265779 A1 | 9/2016 | Haynes et al. |
| 2016/0290650 A1 | 10/2016 | Abd El-Nabi et al. |
| 2016/0313007 A1 | 10/2016 | Martini et al. |
| 2017/0260866 A1 | 9/2017 | Meadows et al. |
| 2017/0328570 A1 | 11/2017 | Lee |
| 2017/0350598 A1 | 12/2017 | Boardman et al. |
| 2018/0128491 A1 | 5/2018 | Boardman et al. |
| 2018/0172273 A1 | 6/2018 | Purcell et al. |
| 2018/0178229 A1 | 6/2018 | Ryon et al. |
| 2018/0187892 A1 | 7/2018 | Patel et al. |
| 2018/0195725 A1 | 7/2018 | Bennett et al. |
| 2020/0158343 A1 | 5/2020 | Boardman et al. |

OTHER PUBLICATIONS

U.S. Appl. No. 15/343,601, filed Nov. 4, 2016.
U.S. Appl. No. 15/343,634, filed Nov. 4, 2016.
U.S. Appl. No. 15/343,672, filed Nov. 4, 2016.
Srinivasan et al., Improving low load combustion, stability, and emissions in pilot-ignited natural gas engines, Journal of Automobile Engineering, Sage journals, vol. 220, No. 2, Feb. 1, 2006, pp. 229-239.
Snyder et al., Emission and Performance of a Lean-Premixed Gas Fuel Injection System for Aeroderivative Gas Turbine Engines, Journal of Engineering for Gas Turbines and Power, ASME Digital Collection, vol. 118, Issue 1, Jan. 1, 1996, pp. 38-45.
Great Britain Search Report dated Aug. 14, 2020 in related Great Britain application No. GB20020764.
Australian Office Action dated Nov. 30, 2020 in related Australian application No. 2020200838.

* cited by examiner

FUEL NOZZLE ASSEMBLY

FIELD

The present subject matter relates generally to gas turbine engine combustion assemblies. More particularly, the present subject matter relates to a premixing fuel nozzle assembly for gas turbine engine combustors.

BACKGROUND

Aircraft and industrial gas turbine engines include a combustor in which fuel is burned to input energy to the engine cycle. Typical combustors incorporate one or more fuel nozzles whose function is to introduce liquid or gaseous fuel into an air flow stream so that it can atomize and burn. General gas turbine engine combustion design criteria include optimizing the mixture and combustion of a fuel and air to produce high-energy combustion while minimizing emissions such as carbon monoxide, carbon dioxide, nitrous oxides, and unburned hydrocarbons, as well as minimizing combustion tones due, in part, to pressure oscillations during combustion. Additionally, general gas turbine engine combustion design must produce gas turbine engine operability at full power condition as well as part power conditions without producing undesirable emissions outputs or pressure oscillations.

Therefore, a need exists for a fuel nozzle or combustion assembly that may produce high-energy combustion while minimizing emissions and combustion instability at full power and part power conditions.

BRIEF DESCRIPTION

Aspects and advantages of the invention will be set forth in part in the following description, or may be obvious from the description, or may be learned through practice of the invention.

A fuel nozzle for a gas turbine engine is generally provided. The fuel nozzle includes an outer sleeve extended circumferentially around a fuel nozzle centerline and extended along a longitudinal direction co-directional to the fuel nozzle centerline. The outer sleeve defines a plurality of first radially oriented air inlet ports through the outer sleeve in circumferential arrangement relative to the fuel nozzle centerline. A centerbody is positioned radially inward of the outer sleeve. The centerbody includes an outer annular wall extended circumferentially around the fuel nozzle centerline and extended along the longitudinal direction co-directional to the fuel nozzle centerline. The outer sleeve further includes a first radial wall extended from a downstream end of the outer annular wall. The centerbody defines a plenum radially inward thereof. The outer annular wall and the outer sleeve together define a first fuel air mixing passage extended along the longitudinal direction therebetween. A fuel injector is disposed in the plenum. The fuel injector includes a tubular outer wall extended co-directional to the fuel nozzle centerline. The outer wall defines a second fuel air mixing passage therewithin. The second fuel air mixing passage is extended through the first radial wall of the centerbody.

In various embodiments, two or more fuel injectors converge to a single fuel-air outlet opening. In one embodiment, the two or more fuel injectors each define a reference fuel injector centerline, in which each fuel injector is extended such as to dispose each fuel injector centerline of each fuel injector at a non-parallel angle relative to one another.

In still various embodiments, the fuel nozzle defines a groove through the first radial wall. The groove protrudes into the first radial wall toward the upstream direction relative to the fuel nozzle. In one embodiment, the groove is extended into the first radial wall circumferentially relative to the fuel nozzle centerline axis. In another embodiment, the groove is extended into the first radial wall at least partially along the radial direction extended from the fuel nozzle centerline. In still another embodiment, the fuel-air outlet opening is defined at the groove such that the fuel-air outlet opening is recessed into the first radial wall.

In one embodiment, the first fuel air mixing passage is extended circumferentially around the fuel nozzle centerline between the outer sleeve and the centerbody.

In another embodiment, the fuel nozzle comprising a plurality of fuel injectors disposed in the plenum. Each fuel injector defines the second fuel air mixing passage extended through the first radial wall of the centerbody in fluid communication with a combustion chamber.

In yet another embodiment, the fuel injector is disposed concentric to the fuel nozzle centerline.

In still another embodiment, the fuel nozzle includes a plurality of the fuel injectors disposed in the plenum in circumferential arrangement relative to the fuel nozzle centerline.

In various embodiments, the fuel nozzle further includes an end wall positioned at an upstream end of the fuel nozzle, in which the end wall is coupled to the outer sleeve. In one embodiment, the end wall defines a first fuel injection port in fluid communication with the first fuel air mixing passage, in which the end wall is configured to provide a flow of fuel to the first fuel air mixing passage via the first fuel injection port. In another embodiment, the plurality of first radially oriented air inlet ports are defined directly radially outward of a first fuel injection exit opening defined at the first fuel injection port in direct fluid communication with the first fuel air mixing passage. In still another embodiment, the first fuel injection port is extended substantially along the longitudinal direction.

In still various embodiments, the fuel injector defines a second fuel injection port in fluid communication with the second fuel air mixing passage. The fuel injector is configured to provide a flow of fuel to the second fuel air mixing passage via the second fuel injection port. In one embodiment, the plurality of second radially oriented air inlet ports are defined directly radially outward of a second fuel injection exit opening defined at the second fuel injection port in direct fluid communication with the second fuel air mixing passage. In another embodiment, the second fuel injection port is extended substantially along the longitudinal direction.

In still yet various embodiments, the centerbody further includes an inner annular wall and a second radial wall extended from the inner annular wall together defining a cavity therebetween. In one embodiment, the second radial wall defines a radial wall opening therethrough providing fluid communication between the plenum and the cavity. In another embodiment, the inner annular wall defines an annular wall opening therethrough providing fluid communication between the cavity and first fuel air mixing passage.

In one embodiment, the first fuel air mixing passage defines a first exit height at the downstream end of the first fuel air mixing passage directly adjacent to the combustion chamber. The first exit height is between an inner surface of the outer sleeve and an outer surface of the inner sleeve, and further wherein the first exit height is between approximately 0.25 centimeters and approximately 0.90 centimeters.

Another aspect of the present disclosure is directed to a gas turbine engine including a combustion section including a combustor assembly defining a combustion chamber. The combustion section further includes a fuel nozzle disposed adjacent to the combustion chamber configured to provide a flow of fuel to the combustion chamber. The fuel nozzle includes an outer sleeve extended circumferentially around a fuel nozzle centerline and extended along a longitudinal direction co-directional to the fuel nozzle centerline, in which the outer sleeve defines a plurality of first radially oriented air inlet ports through the outer sleeve in circumferential arrangement relative to the fuel nozzle centerline; a centerbody positioned radially inward of the outer sleeve, in which the centerbody includes an outer annular wall extended circumferentially around the fuel nozzle centerline and extended along the longitudinal direction co-directional to the fuel nozzle centerline. The outer sleeve further includes a first radial wall extended from a downstream end of the outer annular wall. The centerbody defines a plenum radially inward thereof, and the outer annular wall and the outer sleeve together define a first fuel air mixing passage extended along the longitudinal direction therebetween. The engine further includes a fuel injector disposed in the plenum. The fuel injector includes a tubular outer wall extended co-directional to the fuel nozzle centerline. The outer wall defines a second fuel air mixing passage therewithin. The second fuel air mixing passage is extended through the first radial wall of the centerbody.

In various embodiments, the fuel nozzle includes a plurality of fuel injectors disposed in the plenum. Each fuel injector defines the second fuel air mixing passage extended through the first radial wall of the centerbody in fluid communication with the combustion chamber. In one embodiment, a first fuel injector is disposed concentric to the fuel nozzle centerline, and a plurality of second fuel injectors is disposed in the plenum in circumferential arrangement relative to the fuel nozzle centerline. In another embodiment, the centerbody further includes an inner annular wall and a second radial wall extended from the inner annular wall together defining a cavity therebetween. The second radial wall defines a radial wall opening therethrough providing fluid communication between the plenum and the cavity. The inner annular wall defines an annular wall opening therethrough providing fluid communication between the cavity and first fuel air mixing passage. The radial wall opening and the annular wall opening together provide fluid communication from the plenum to the first fuel air mixing passage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
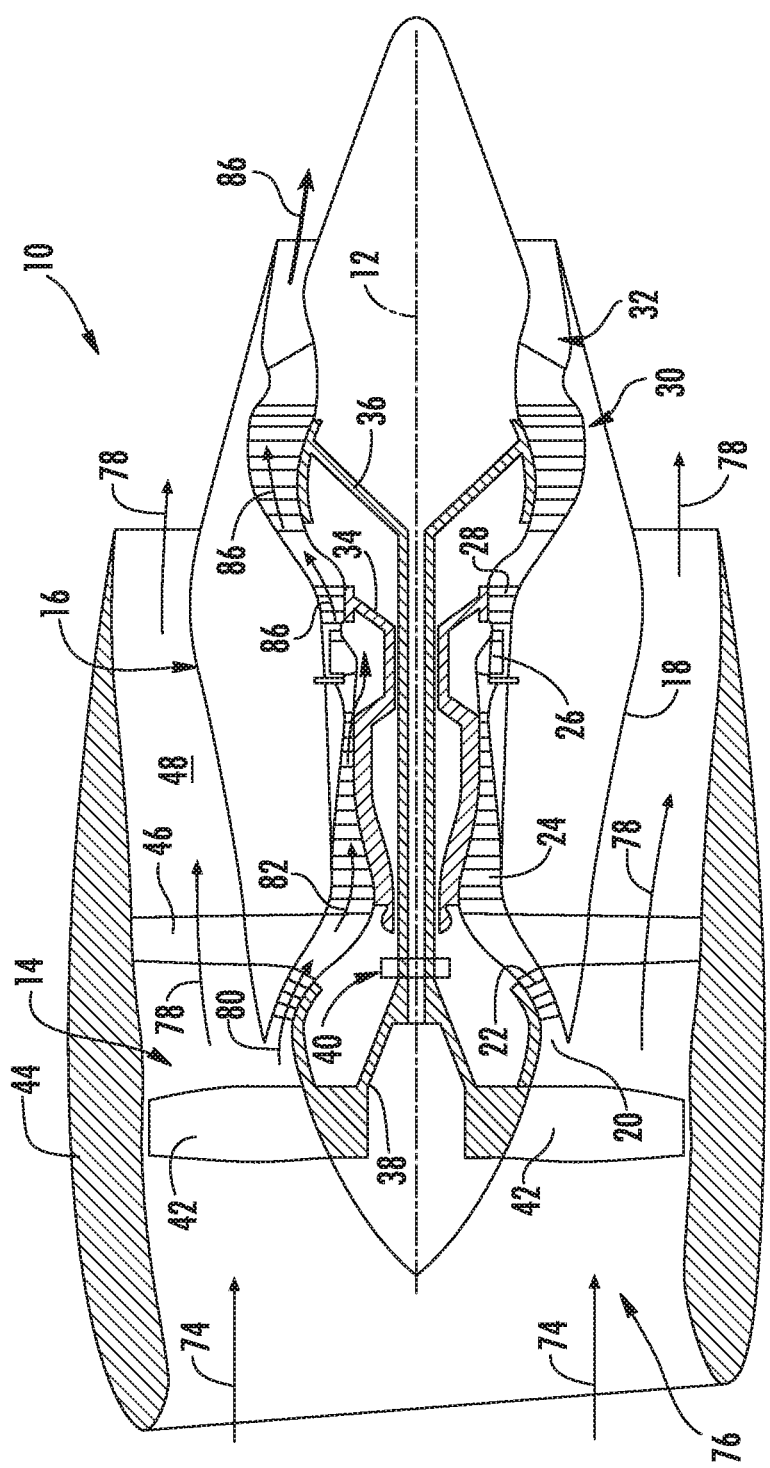
FIG. 1 is a schematic cross sectional view of an exemplary gas turbine engine incorporating an exemplary embodiment of a fuel nozzle and combustor assembly.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a fuel nozzle that may produce high-energy combustion while minimizing emissions and combustion instability at full power and part power conditions are generally provided. The fuel nozzle includes a plurality of fuel air mixing passages defining concentric, nested premixer annuli surrounded by a fuel air premixer annulus such as to beneficially provide relatively short, compact, flames at the combustion chamber such as to mitigate formation of oxides of nitrogen and other emissions (e.g., unburned hydrocarbons, smoke, carbon monoxide, carbon dioxide, etc.). The fuel nozzle defines hydraulic diameters that may further provide relatively short, compact flames at the combustion chamber such as to mitigate formation of oxides of nitrogen and other emissions while desirably meeting effective flow area targets. The shorter, more compact flames at the combustion chamber from the fuel nozzle may further enable a longitudinally shorter combustor assembly while providing similar or greater energy output as known combustion sections.

Referring now to the drawings, FIG. 1 is a schematic partially cross-sectioned side view of an exemplary high by-pass turbofan jet engine 10 herein referred to as "engine 10" as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 2:
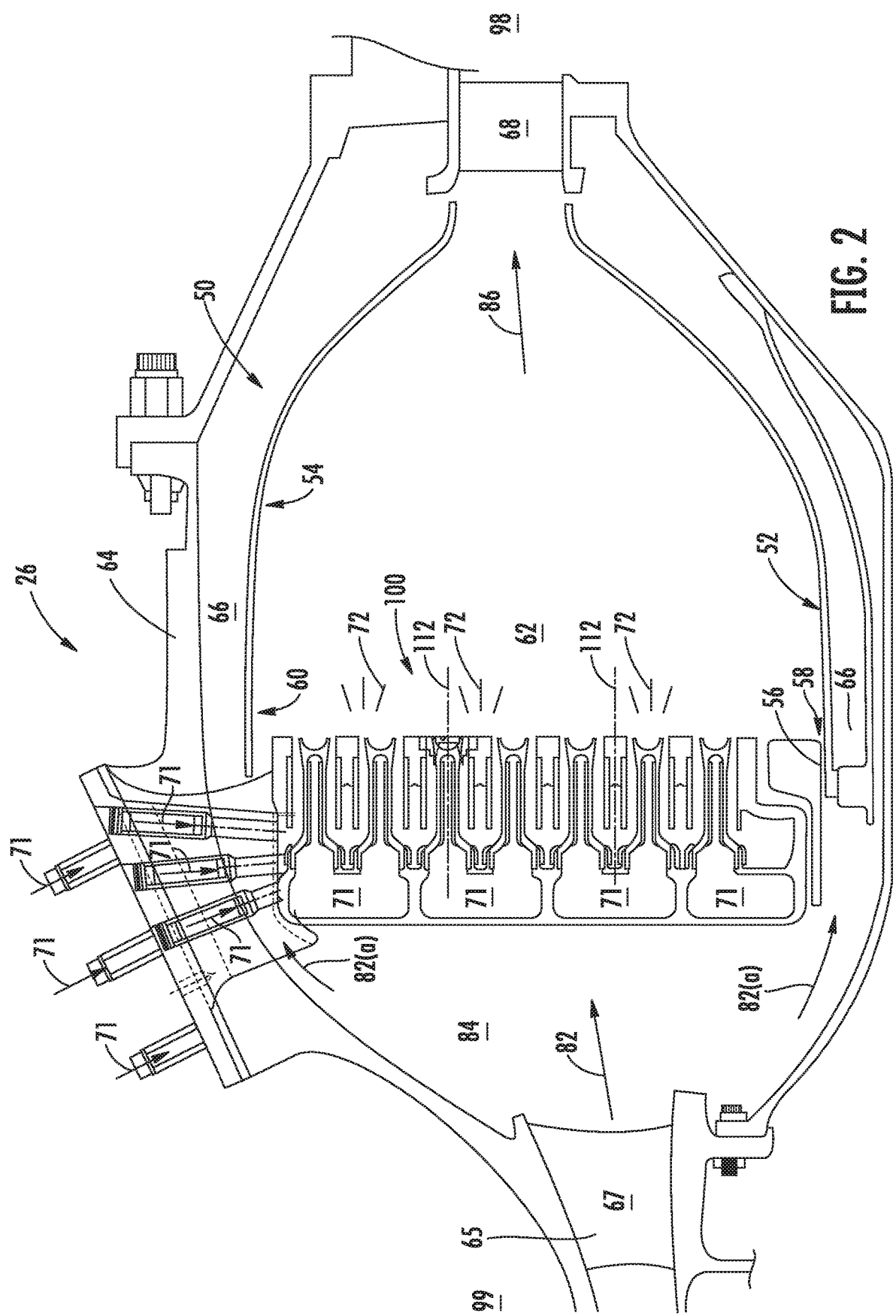
FIG. 2 is an axial cross sectional view of an exemplary embodiment of a combustor assembly of the exemplary engine shown in FIG. 1.

FIG. 2 is a cross sectional side view of an exemplary combustion section 26 of the core engine 16 as shown in FIG. 1. As shown in FIG. 2, the combustion section 26 may generally include an annular type combustor 50 having an annular inner liner 52, an annular outer liner 54 and a bulkhead wall 56 that extends radially between upstream ends 58, 60 of the inner liner 52 and the outer liner 54 respectfully. In other embodiments of the combustion section 26, the combustion assembly 50 may be a can or can-annular type. As shown in FIG. 2, the inner liner 52 is radially spaced from the outer liner 54 with respect to engine centerline 12 (FIG. 1) and defines a generally annular combustion chamber 62 therebetween. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 may be encased within an outer casing 64. An outer flow passage 66 may be defined around the inner liner 52 and/or the outer liner 54. The inner liner 52 and the outer liner 54 may extend from the bulkhead wall 56 towards a turbine nozzle or inlet 68 to the HP turbine 28 (FIG. 1), thus at least partially defining a hot gas path between the combustor assembly 50 and the HP turbine 28. A fuel nozzle assembly 100 (fuel nozzle 100) may extend at least partially through the bulkhead wall 56 and provide a fuel-air mixture 72 to the combustion chamber 62.

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows across a compressor exit guide vane (CEGV) 67 and through a prediffuser 65 into a diffuser cavity or head end portion 84 of the combustion section 26.

The prediffuser 65 and CEGV 67 condition the flow of compressed air 82 to the fuel nozzle 100. The compressed air 82 pressurizes the diffuser cavity 84. The compressed air 82 enters the fuel nozzle 100 and into a plurality of fuel injectors 100 within the fuel nozzle 100 to mix with a fuel 71. The fuel 71 may be a gaseous or liquid fuel, including, but not limited to, fuel oils, jet fuels propane, ethane, hydrogen, coke oven gas, natural gas, synthesis gas, or combinations thereof. The fuel injectors 100 premix fuel 71 and air 82 within the array of fuel injectors with little or no swirl to the resulting fuel-air mixture 72 exiting the fuel nozzle 100. After premixing the fuel 71 and air 82 within the fuel injectors 100, the fuel-air mixture 72 burns from each of the plurality of fuel injectors 100 as an array of compact, tubular flames stabilized from each fuel nozzle 100.

Typically, the LP and HP compressors 22, 24 provide more compressed air to the diffuser cavity 84 than is needed for combustion. Therefore, a second portion of the compressed air 82 as indicated schematically by arrows 82(*a*) may be used for various purposes other than combustion. For example, as shown in FIG. 2, compressed air 82(*a*) may be routed into the outer flow passage 66 to provide cooling to the inner and outer liners 52, 54. In addition or in the alternative, at least a portion of compressed air 82(*a*) may be routed out of the diffuser cavity 84. For example, a portion of compressed air 82(*a*) may be directed through various flow passages to provide cooling air to at least one of the HP turbine 28 or the LP turbine 30.

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

Figure 3:
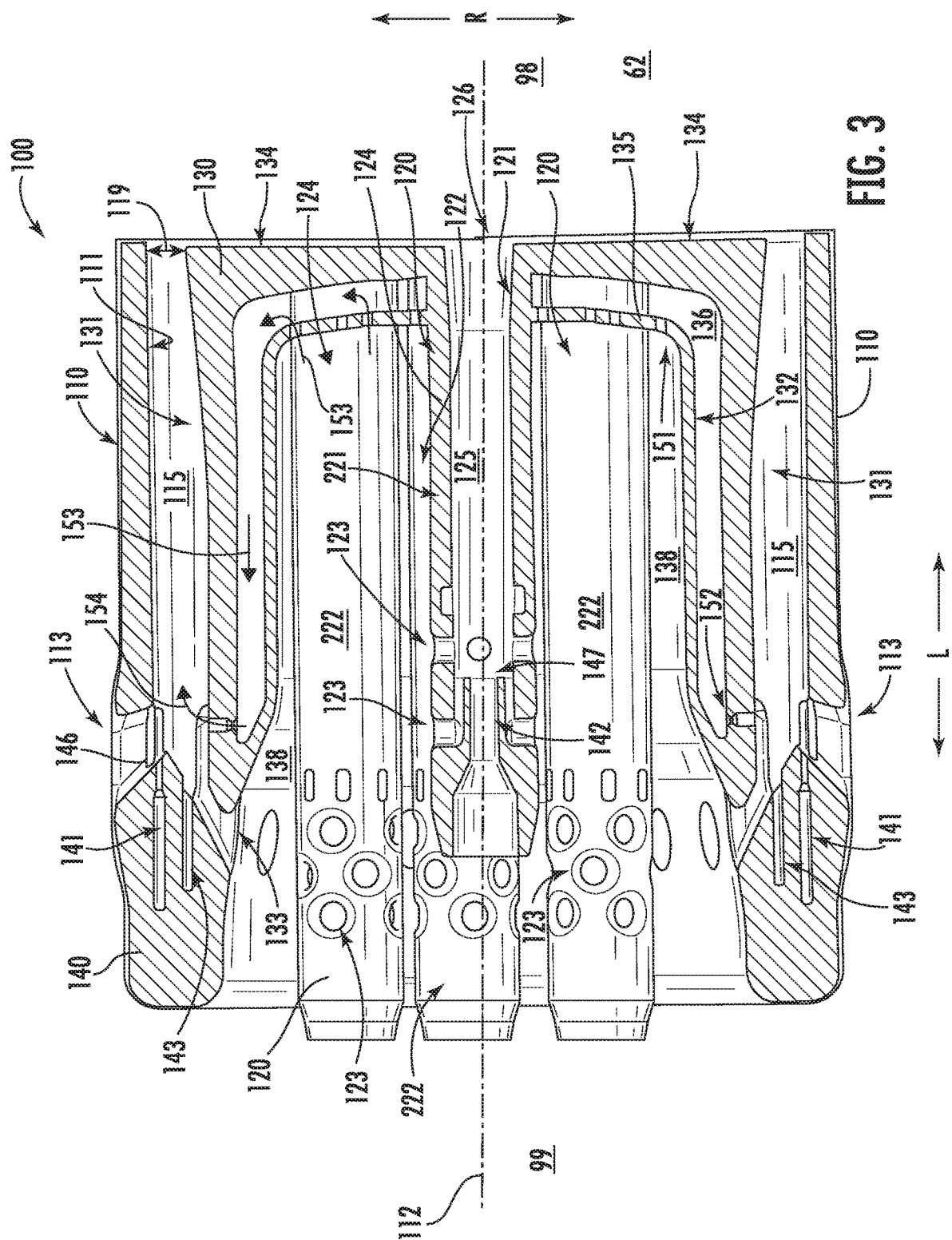
FIG. 3 is a cutaway longitudinal cross sectional view of an embodiment of the fuel nozzle according to an aspect of the present disclosure.
Figure 4:
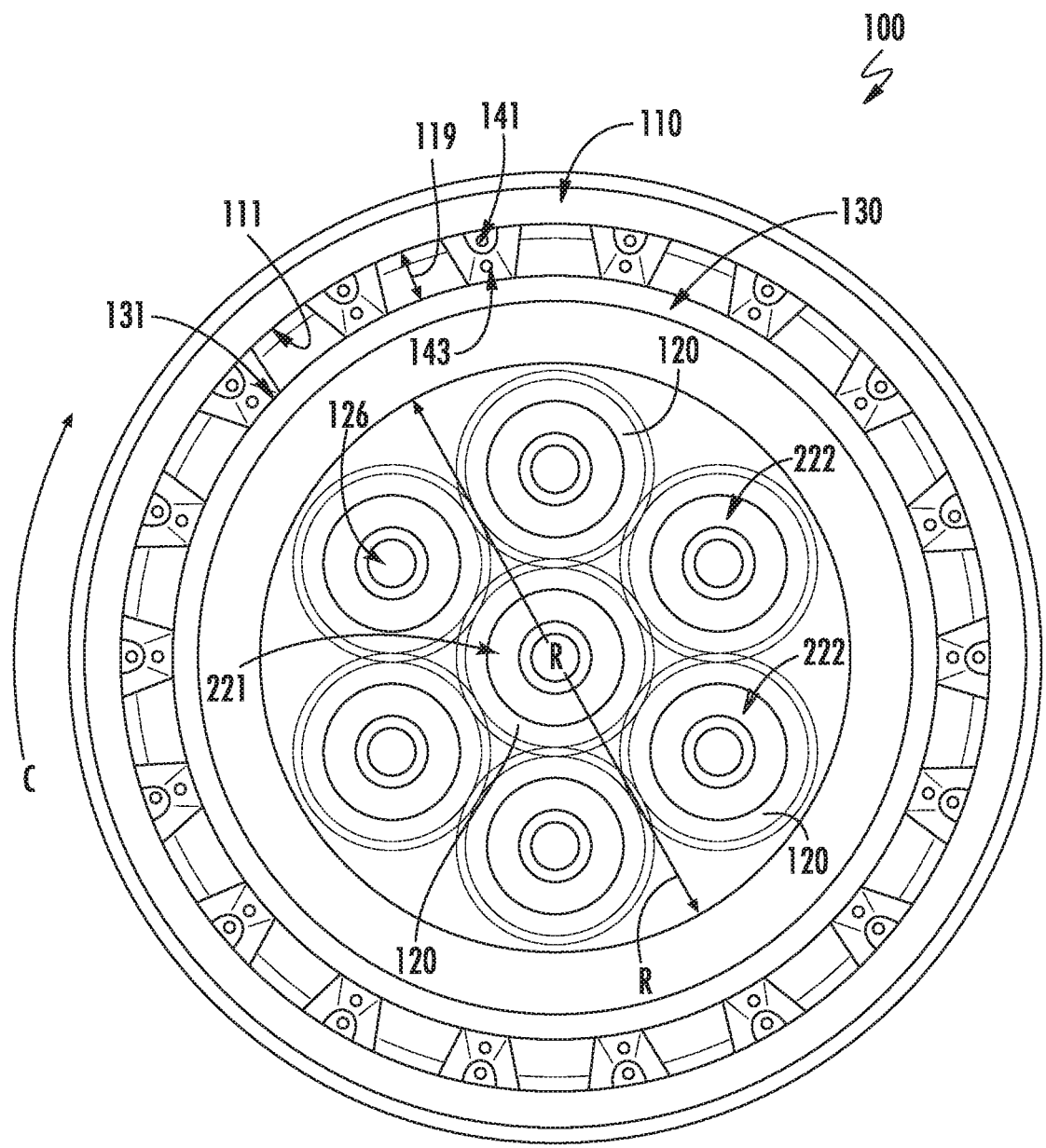
FIG. 4 is a flowpath view of an embodiment of the fuel nozzle according to aspects of the present disclosure.
Figure 5:
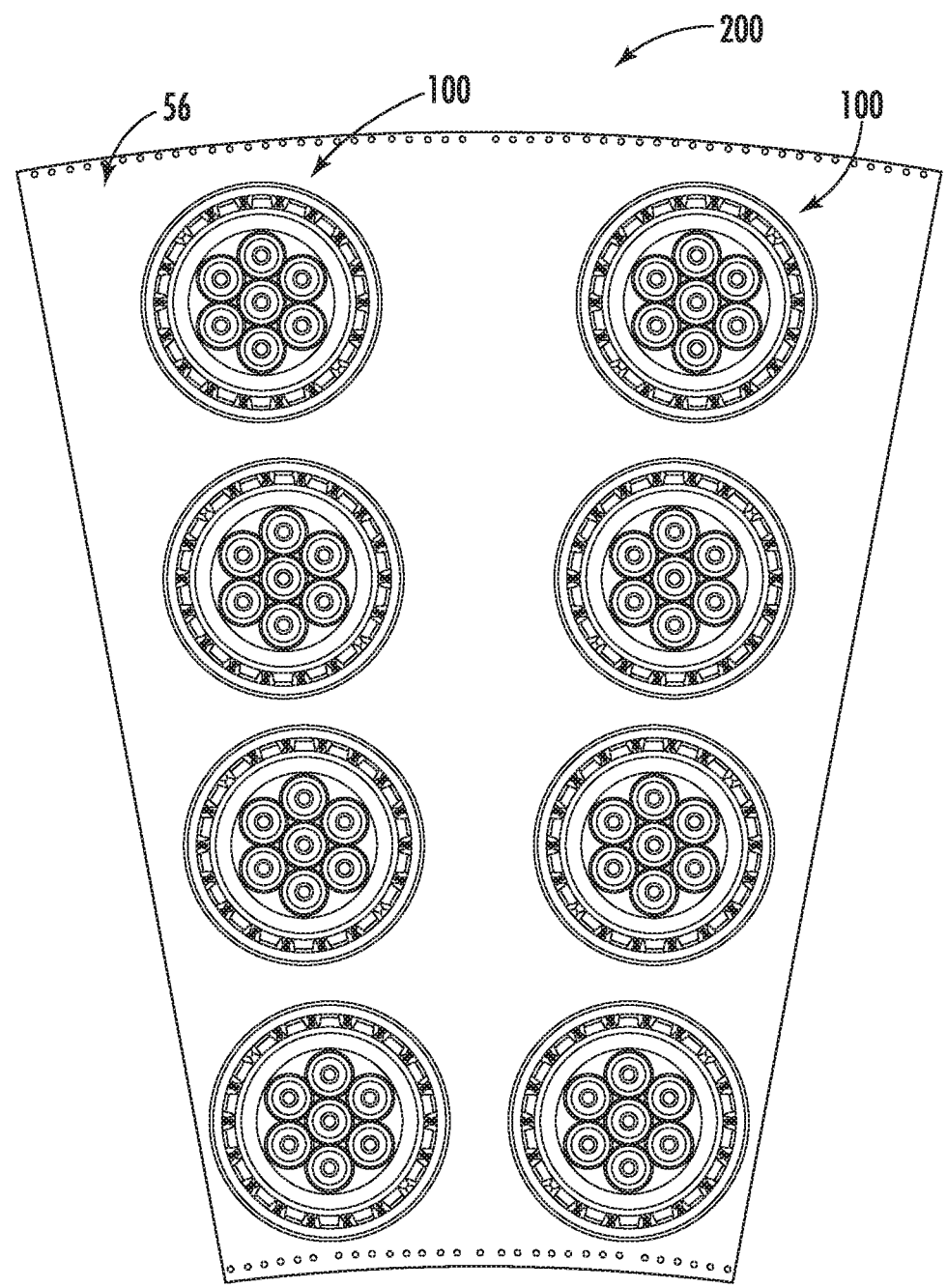
FIG. 5 is a perspective view of an embodiment of the fuel nozzle according to aspects of the disclosure provided in FIGS. 2-4.
Figure 8:
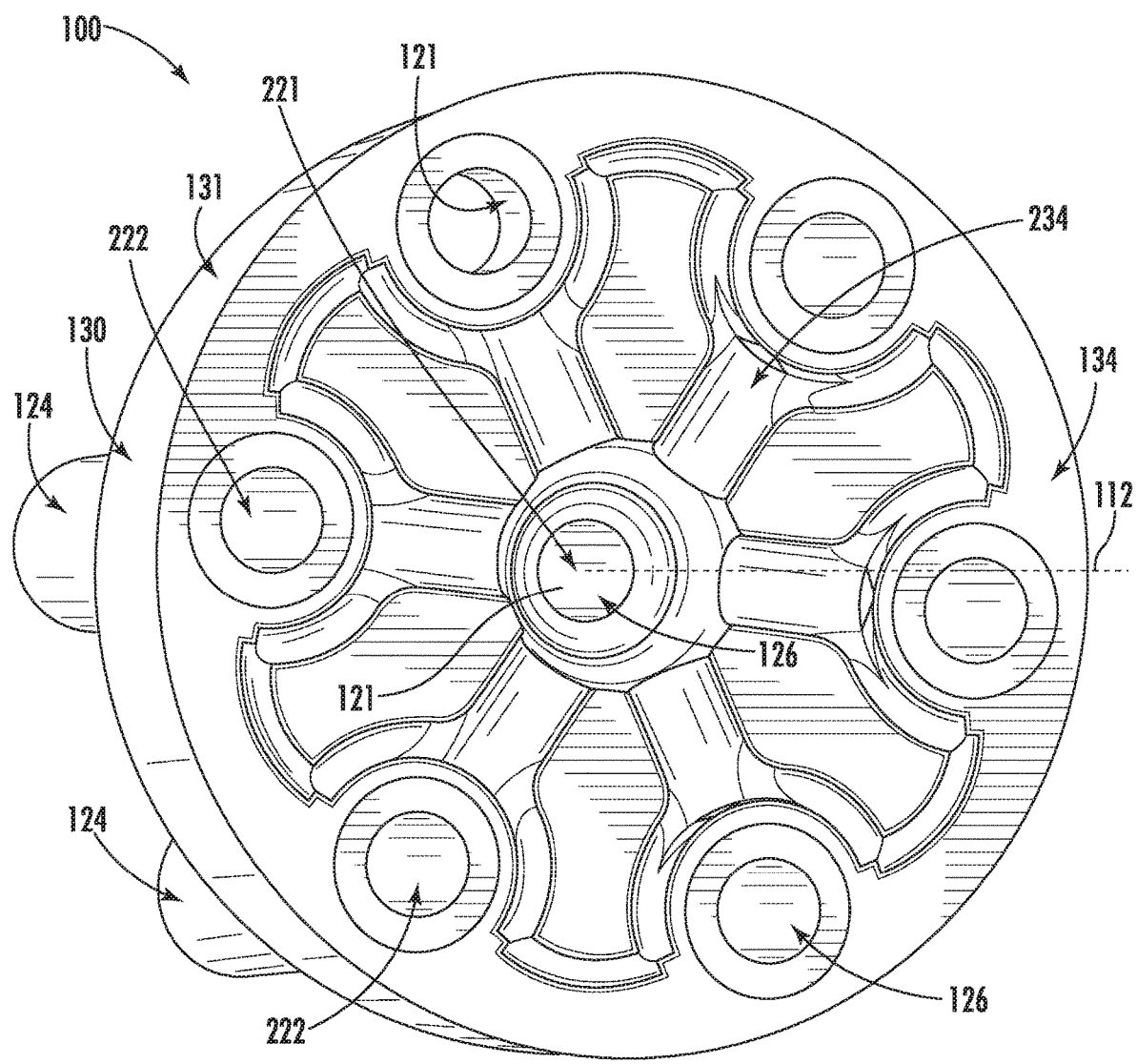
FIG. 8 is a flowpath view of a portion of another embodiment of the fuel nozzle according to aspects of the present disclosure.
Figure 9:
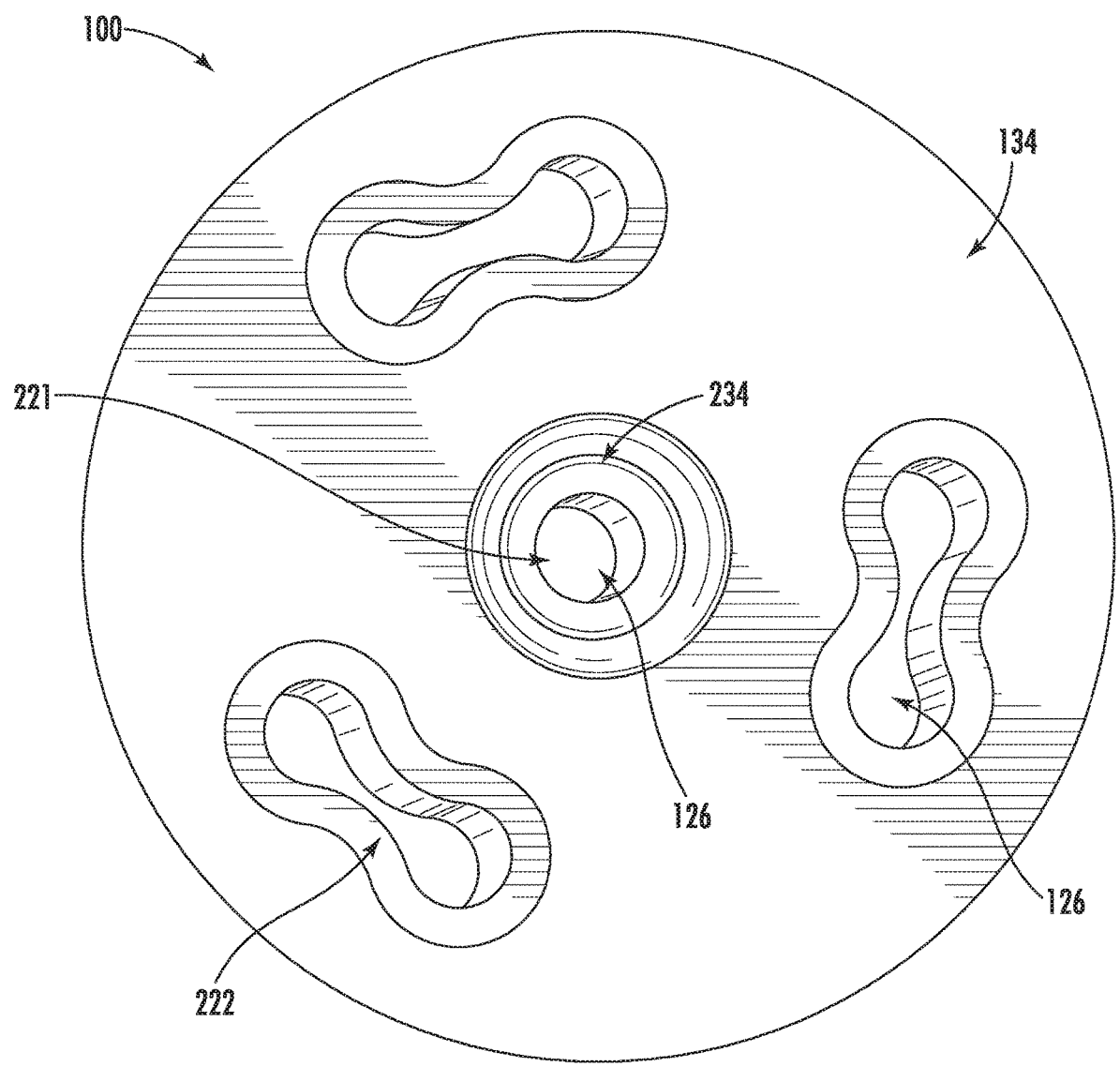
FIG. 9 is a perspective view of an embodiment of a pair of fuel injectors of the fuel nozzle according to aspects of the present disclosure.
Figure 10:
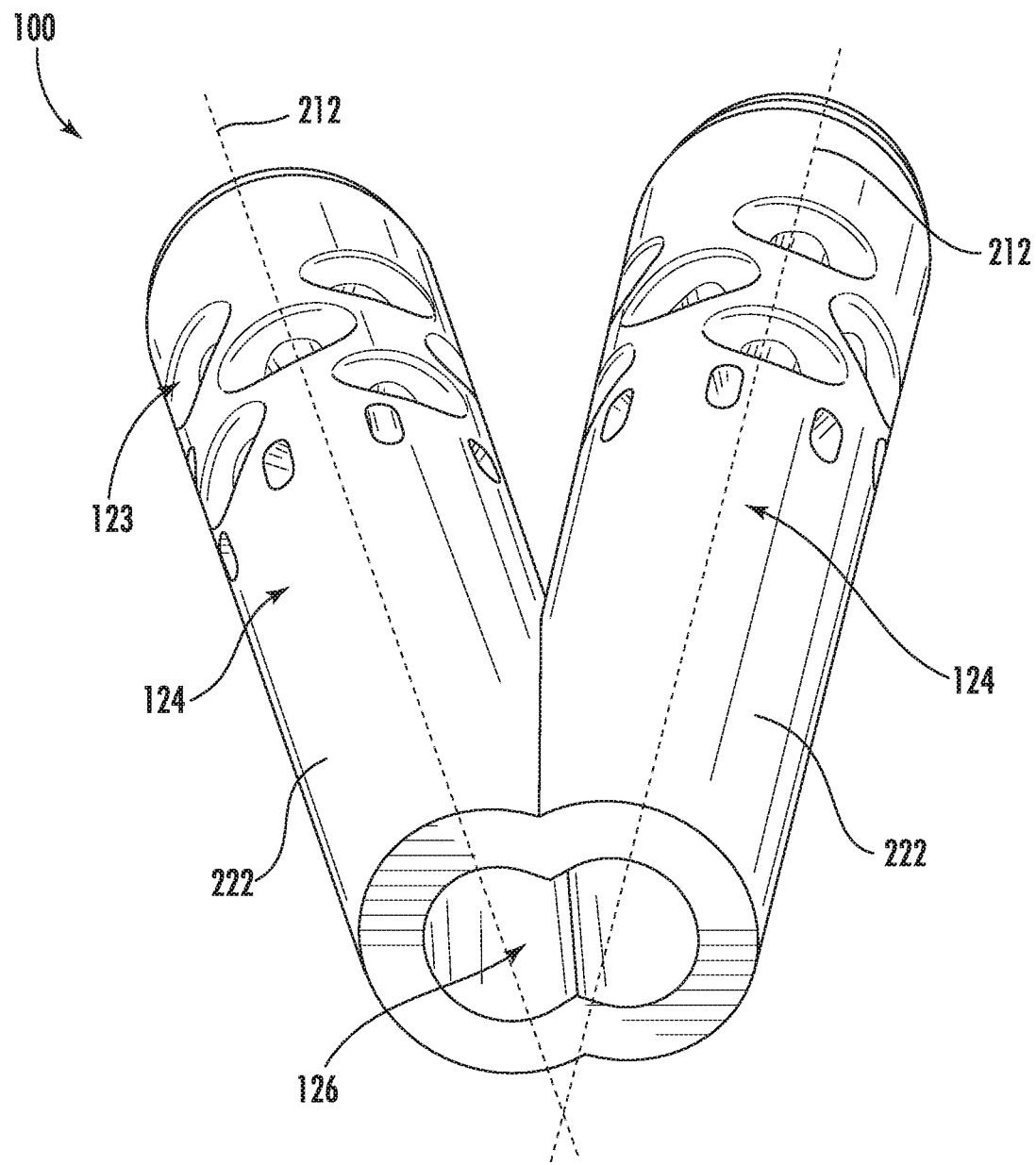
FIG. 10 is a flowpath view of a portion of an annular section of the combustor assembly of FIG. 2 including an exemplary embodiment of the fuel nozzles according to an aspect of the present disclosure.

Referring now to FIGS. 3-10, exemplary embodiments of the fuel nozzle 100 are generally provided. FIG. 3 provides a cutaway cross sectional view of an embodiment of the fuel nozzle 100. FIG. 4 provides a flow path view of the embodiment of the fuel nozzle 100 generally depicted in FIG. 3. FIG. 10 provides a flow path view of an annular section of the bulkhead wall 56 through which a plurality of the fuel nozzle 100 as the fuel nozzle assembly 100 is extended therethrough.

Referring to FIGS. 3-10, the fuel nozzle 100 defines a reference fuel nozzle centerline 112 therethrough. The fuel nozzle 100 includes an outer sleeve 110 extended circumferentially around a fuel nozzle centerline 112. The outer sleeve 110 is further extended along a longitudinal direction L substantially co-directional to the fuel nozzle centerline 112. The outer sleeve 110 defines a plurality of first radially oriented air inlet ports 113 through the outer sleeve 110 in arranged along a circumferential direction C relative to the fuel nozzle centerline 112.

The fuel nozzle 100 further includes a fuel injector 120 positioned inward along a radial direction R of the outer sleeve 110 relative to the fuel nozzle centerline 112. The fuel injector 120 is extended along the longitudinal direction L co-directional, or substantially or approximately parallel, to the fuel nozzle centerline 112. The fuel injector 120 includes a substantially tubular outer wall 124 extended co-directional to the fuel nozzle centerline 112. The outer wall 124 defines an inner radial surface 121 and an outer radial surface 122, together defining a second fuel air mixing passage 125. The fuel injector 120 further defines a plurality of second radially oriented air inlet ports 123 through the fuel injector 120 arranged circumferentially through the outer wall 124. The plurality of second radially oriented air inlet ports 123 may further be disposed in longitudinal arrangement through the outer wall 124 along the longitudinal direction L. The fuel injector 120 further includes a fuel injection port 142 for injecting fuel to the second fuel air mixing passage 125.

The fuel nozzle 100 further includes an annular centerbody 130 disposed inward of the outer sleeve 110 along the radial direction R. The centerbody 130 includes an outer annular wall 131 extended co-directional to the fuel nozzle centerline 112 (e.g., along the longitudinal direction L) and circumferentially surrounding the fuel injector 120 (e.g., along circumferential direction C in FIG. 4). The centerbody 130 further includes a first radial wall 134 extended from the downstream end 98 of the outer annular wall 131. The first radial wall 134 may be disposed adjacent to the combustion chamber 62, such as to define a heat shield or barrier between the combustion chamber 62 and internal portions of the fuel nozzle 100. The outer annular wall 131 of the centerbody 130 is defined radially between the outer sleeve 110 and the fuel injector 120.

In still various embodiments, the first radial wall 134 defines a fuel-air outlet opening 126 therethrough in direct fluid communication with the second fuel air mixing passage 125 of the fuel injector 120. The fuel-air outlet opening 126 provides direct fluid communication of a flow of fuel-air mixture from the second fuel air mixing passage 125 to the combustion chamber 62.

In various embodiments, a plurality or cluster of fuel injectors 120 is disposed radially inward of the outer annular wall 131. In one embodiment, at least one fuel injector 120 is disposed concentric to the fuel nozzle centerline 112, such as depicted at a first fuel injector 221. In various embodiments, the plurality of fuel injectors 120 are disposed in circumferential arrangement relative to the fuel nozzle centerline axis 112, such as depicted at a second fuel injector 222.

The fuel injector 120 is extended generally co-directional to the fuel nozzle centerline axis 112 such as to extend through the first radial wall 134 of the centerbody 130 in fluid communication with the combustion chamber 62. Each fuel injector 120 defines a second fuel air mixing passage 125 within the outer wall 124, in which the second fuel air mixing passage 125 is in fluid communication with the combustion chamber 62. The first radial wall 134 may further mount or otherwise support the arrangement of fuel injectors 120 in the plenum 138.

In one embodiment, a first fuel air mixing passage 115 is extended along circumferentially relative to the fuel nozzle centerline axis 112 around the fuel nozzle centerline 112 between the outer sleeve 110 and the centerbody 130. More particularly, the first fuel air mixing passage 115 is defined between an inner surface 111 of the outer sleeve 110 and an outer surface of the outer annular wall 131 of the centerbody 130.

In various embodiments, the first fuel air mixing passage 115 defines a first exit height 119 at the downstream end 98 of the first fuel air mixing passage 115 directly adjacent along the longitudinal direction L to the combustion chamber 62. The first exit height 119 is between the inner surface 111 of the outer sleeve 110 and the outer annular wall 131 of the centerbody 130 each extended substantially along the longitudinal direction L between each of which the first fuel air mixing passage 115 is defined. In one embodiment, the first exit height 119 is between approximately 0.25 centimeters and approximately 0.90 centimeters. In more particular embodiments, the first exit height 119 is defined between the inner surface 111 and the outer annular wall 131 within a distance equal to or less than the first exit height 119 from the combustion chamber 62 from the downstream end 98 of the first fuel air mixing passage 115. For example, the first exit height 119 is defined within the first fuel air mixing passage 115 within approximately 0.90 centimeters or less of the downstream end 98 of the first fuel air mixing passage 115. In still more particular embodiments, the first exit height 119 defines a hydraulic diameter of the first fuel air mixing passage 115.

The fuel air mixing passage 115 defining respective exit height 119 each defining a respective hydraulic diameter of the mixing passage 115 may define the exit height 119 at least in part as:

$$D_H = \frac{4A}{P}$$

wherein $D_H$ is the hydraulic diameter at the mixing passage 115, A is the cross sectional area of the flow of fuel-air mixture through the mixing passage 115, and P is the wetter perimeter of the cross section. It should be appreciated that the wetted perimeter is all or substantially all of the respective surfaces 111, 131 between which each exit height 119 is defined along the circumferential direction C, such as generally depicted in regard to FIGS. 6-10. It should further be appreciated that the cross sectional area is defined at least in part by the area between the surfaces 111, 131 defining the respective mixing passage 115. It should therefore be appreciated that embodiments of the fuel nozzle 100 may define the hydraulic diameter between approximately 0.25 centimeters and approximately 0.90 centimeters. In other embodiments, the hydraulic diameter may be greater or lesser based on the apparatus to which the fuel nozzle 100 is used (e.g., marine or industrial engines power generation, propulsion, auxiliary power generation, etc.).

The fuel nozzle 100 including the plurality of fuel air mixing passage 115 may define a premixer annuli surrounding one or more fuel injectors 120, such as a plurality or cluster of fuel injectors 120 radially inward of the fuel air mixing passage 115, such as to beneficially provide relatively short, compact, flames at the combustion chamber 62 such as to mitigate formation of oxides of nitrogen and other emissions. The fuel nozzle 100 defining the exit height 119 defining the hydraulic diameters further provide relatively short, compact flames at the combustion chamber 62 such as to mitigate formation of oxides of nitrogen and other emissions while desirably meeting effective flow area targets. The shorter, more compact flames at the combustion chamber 62 from the fuel nozzle 100 may further enable a longitudinally shorter combustor assembly 50 while providing similar or greater energy output as known combustion sections. In various embodiments, the fuel nozzle 100 provides shorter, more compact flames between approximately 0.60 centimeters and approximately 5.60 centimeters along the longitudinal direction L from the downstream end 98 of the fuel nozzle 100.

In various embodiments, flows of fuel-air mixture exiting the first fuel air mixing passage 115 may be imparted with a swirl such as to desirably alter, modify, or otherwise affect combustor flame stability and heat release, thereby improving lean blowout (LBO) margin, pressure oscillations, and combustion dynamics generally. The flow of fuel-air mixture exiting the fuel air mixing passage 115 may be imparted via the flow of air entering each fuel air mixing passage 115 through each respective radially oriented air inlet port 113, 123.

In one embodiment, the first radially oriented air inlet port 113 is in fluid communication with the first fuel air mixing passage 115 such as to provide a flow of air therethrough to mix with a flow of liquid or gaseous fuel. In another embodiment, the second radially oriented air inlet port 123 is in fluid communication with the second fuel air mixing passage 125 such as to provide a flow of air therethrough to mix with a flow of liquid or gaseous fuel. Various embodiments of the air inlet ports 113, 123 may be disposed along the radial direction R relative to the fuel nozzle centerline 112. Still various embodiments of the air inlet ports 113, 123 may further be disposed at least partially tangentially relative to the fuel nozzle centerline 112, such as to further impart a swirl to the air entering the respective fuel air mixing passage 115 along the circumferential direction C relative to the fuel nozzle centerline 112. In still yet various embodiments, the air inlet ports 113, 123 may be configured such as to impart a substantially longitudinal flow through one or more of the mixing passage 115 such as to mitigate providing a swirl to the flow of air entering the mixing passage 115 or a swirl to the fuel-air mixture exiting the mixing passage 115.

Referring still to FIGS. 3-10, although the fuel air mixing passage 115 are depicted as extended substantially along the longitudinal direction L, in various embodiments the fuel air mixing passage 115 may be extended in serpentine arrangement, or include a plurality of lobes or protuberances, such as to induce turbulence of the flow of fuel and/or air at each respective mixing passage 115.

Referring still to FIGS. 3-10, in various embodiments the fuel nozzle 100 further includes an end wall 140 positioned at an upstream end 99 of the fuel nozzle 100 in which the end wall 140 is attached, coupled, or formed directly to the outer sleeve 110. Referring more clearly to FIG. 3, the end wall 140 is configured to receive liquid and/or gaseous fuel from a fuel system (not shown) and provide the fuel to the mixing passage 115 for mixing with air and combustion at the combustion chamber 62. In various embodiments, the end wall 140 defines a first fuel injection port 141 in fluid communication with the first fuel air mixing passage 115. The end wall 140 is configured to provide a flow of fuel to the first fuel air mixing passage 115 via the first fuel injection port 141. In one embodiment, the first fuel injection port 141 is extended substantially along the longitudinal direction L. The longitudinally extended first fuel injection port 141 may provide a substantially longitudinal flow of fuel through the first fuel injection port 141 to the first fuel air mixing passage 115. However, in other embodiments, the plurality of first radially oriented air inlet ports 113 may impart a swirl to the flow of air entering the first fuel air mixing passage 115, such as to provide a swirl along the circumferential direction C of the fuel-air mixture in the first fuel air mixing passage 115. The end wall 140 may further be configured to provide one or more flows of liquid or gaseous fuel to each of the fuel injection ports 141, 142, 143 of the fuel nozzle 100.

In one embodiment, the plurality of first radially oriented air inlet ports 113 are defined directly outward along the radial direction R of a first fuel injection exit opening 146 defined at the first fuel injection port 141 in direct fluid communication with the first fuel air mixing passage 115. For example, the first fuel injection exit opening 146 is defined at the downstream end 98 of the first fuel injection port 141 such as to define a plane at which fuel exits the first fuel injection port 141 and enters the first fuel air mixing passage 115. The first fuel injection exit opening 146 defining such a plane may be defined directly inward along the radial direction R of the plurality of first radially oriented air inlet ports 113.

Referring still to FIG. 3, in still various embodiments, the fuel injector 120 defines a second fuel injection port 142 in fluid communication with the second fuel air mixing passage 125. The fuel injector 120 is configured to provide a flow of fuel to the second fuel air mixing passage 125 via the second fuel injection port 142. In one embodiment, the second fuel injection port 142 is extended substantially along the longitudinal direction L. The second fuel injection port 142 is extended generally radially inward of the outer wall 124 and along the longitudinal direction L. The longitudinally extended second fuel injection port 142 may provide a substantially longitudinal flow of fuel through the second fuel injection port 142 to the first fuel air mixing passage 115. However, in other embodiments, the plurality of second radially oriented air inlet ports 123 may impart a swirl to the flow of air entering the second fuel air mixing passage 125, such as to provide a swirl along the circumferential direction C of the fuel-air mixture in the second fuel air mixing passage 125.

In one embodiment, the plurality of second radially oriented air inlet ports 123 are defined directly inward along the radial direction R of a second fuel injection exit opening 147 defined at the second fuel injection port 142 in direct fluid communication with the second fuel air mixing passage 125. For example, the second fuel injection exit opening 147 is defined at the downstream end 98 of the second fuel injection port 142 such as to define a plane at which fuel exits the second fuel injection port 142 and enters the second fuel air mixing passage 125. The second fuel injection exit opening 147 defining such a plane may be defined directly outward along the radial direction R of the plurality of second radially oriented air inlet ports 123. In various embodiments, at least a portion of the plurality of second radially oriented air inlet ports 123 may be disposed upstream (i.e., toward upstream end 99) of the second fuel injection exit opening 147, or downstream (i.e., toward downstream end 98) of the second fuel injection exit opening 147, or both.

Referring still to FIG. 3, in another embodiment, the centerbody 130 may define a plurality of third radially oriented air inlet ports 133 through the centerbody 130 in circumferential arrangement relative to the fuel nozzle centerline 112. In one embodiment, the plurality of third radially oriented air inlet ports 133 may be defined through the centerbody 130 in fluid communication with the first fuel air mixing passage 115. The plurality of third radially oriented air inlet ports 133 may be defined inward along the radial direction R of the plurality of first radially oriented air inlet ports 113. The plurality of third radially oriented air inlet ports 133 may further be defined directly inward along the radial direction R of a third fuel injection port 143 extended along the longitudinal direction L through the end wall 140. The third fuel injection port 143 may be defined inward along the radial direction R of the first fuel injection port 141. The plurality of first radially oriented air inlet ports 113 may generally be disposed radially opposing the plurality of third radially oriented air inlet ports 133. Each of the first fuel injection ports 141 and third fuel injection ports 143 may be defined radially between the opposing first radially oriented air inlet ports 113 and third radially oriented air inlet ports 133.

In various embodiments, the centerbody 130 further includes an inner annular wall 132 disposed inward along the radial direction R of the outer annular wall 131. A second radial wall 135 is disposed forward (i.e., toward upstream end 99) of the first radial wall 134. The second radial wall 135 and the first radial wall 134 may each define a cavity 136 therebetween. The cavity 136 may further be defined between the outer annular wall 131 and the inner annular wall 132. In various embodiments, a portion of the inner annular wall 132 converges radially to attach to the outer annular wall 131. In still various embodiments, the second radial wall 135 and the first radial wall 134 are each attached to the fuel injector 120 to define a substantially enclosed cavity 136. It should be appreciated that in other embodiments (now shown), the second radial wall 135 may converge longitudinally to attach to the first radial wall 134, such as to define a substantially enclosed cavity 136.

Embodiments of the fuel nozzle 100 may further define a plenum 138 radially inward within the centerbody 130. In one embodiment, the plenum 138 defines a substantially hollow cavity in which the fuel injector 120, or plurality or cluster thereof, are substantially disposed. In particular embodiments, the plenum 138 is defined radially inward of the inner annular wall 132.

In one embodiment, the second radial wall 135 defines a radial wall opening 151 therethrough providing fluid communication between the plenum 138 and the cavity 136. In various embodiments, the radial wall opening 151 provides direct fluid communication between the plenum 138 and the cavity 136. In another embodiment, the outer annular wall 131 defines an annular wall opening 152 therethrough providing fluid communication between the cavity 136 and the first fuel air mixing passage 115. In various embodiments, the annular wall opening 152 provides direct fluid communication between the cavity 136 and the first fuel air mixing passage 115. During operation of the fuel nozzle 100 and the engine 10, a flow of air, depicted schematically by arrows 153, flows from the plenum 138 through the radial wall opening 151 into the cavity 136. The flow of air 153 further egresses from the cavity 136 into the first fuel air mixing passage 115 via the annular wall opening 152, such as depicted schematically by arrows 154.

Figure 6:
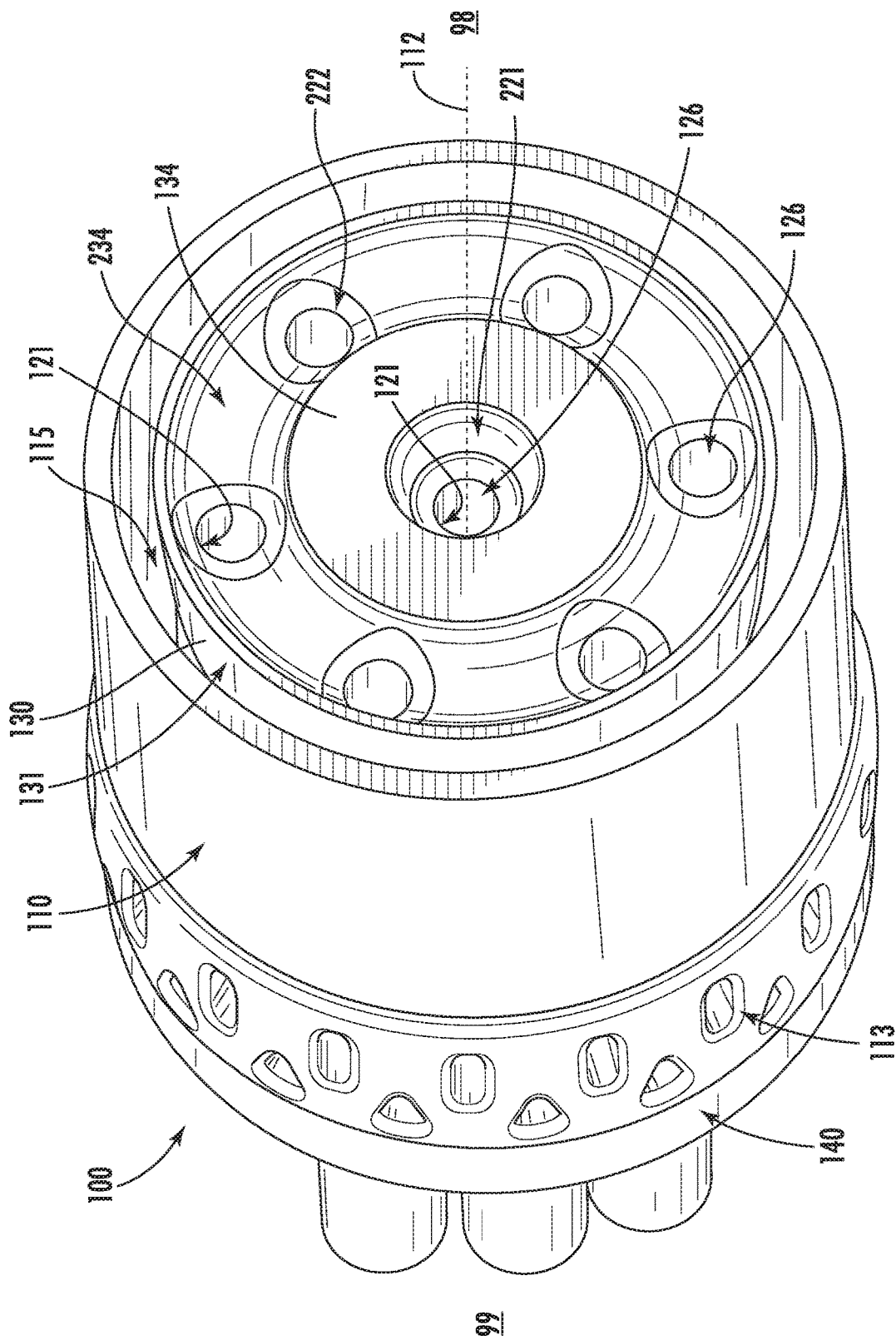
FIG. 6 is a perspective view of another embodiment of the fuel nozzle according to aspects of the disclosure provided in FIGS. 2-4.
Figure 7:
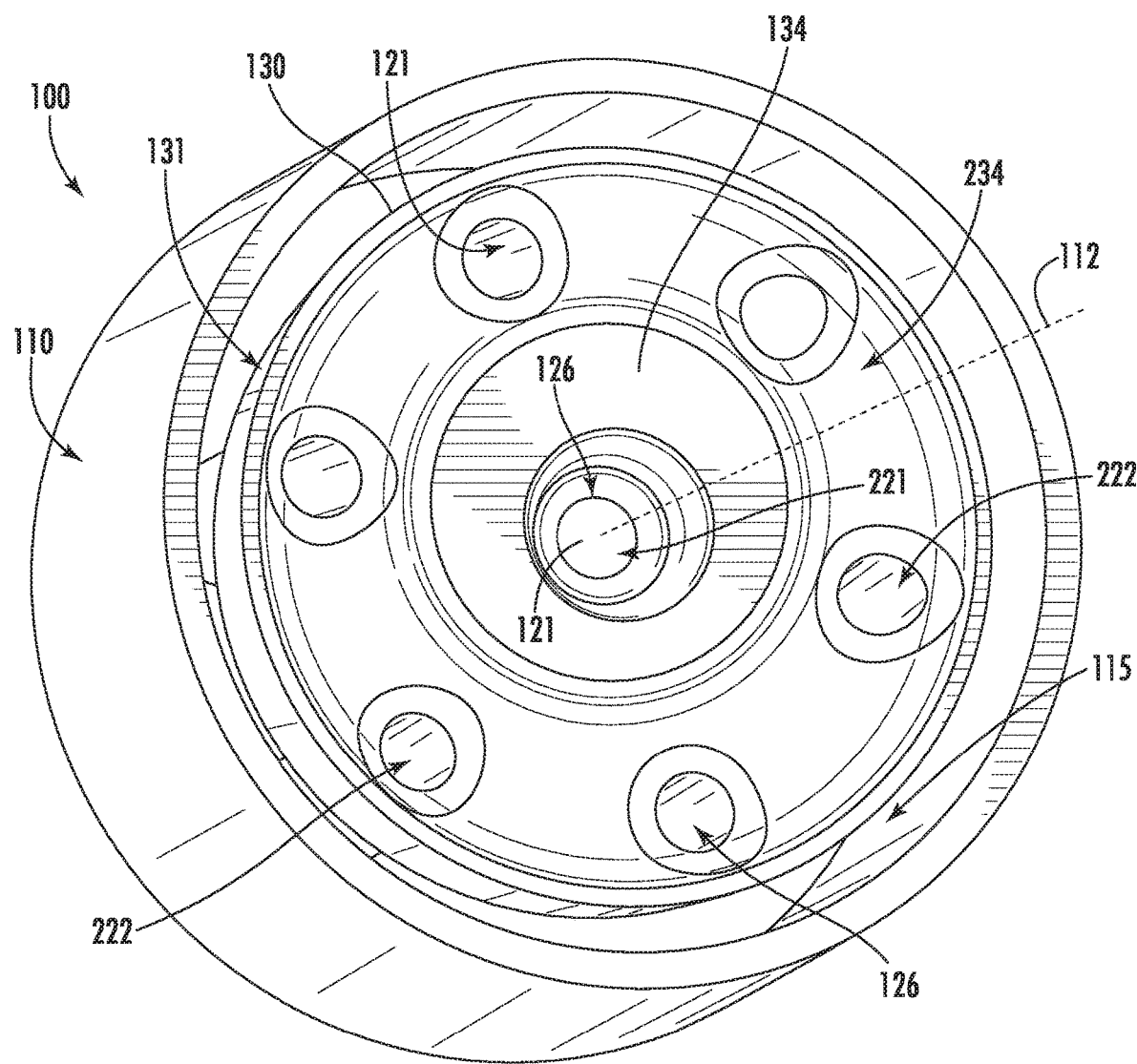
FIG. 7 is a flowpath view of a portion of an embodiment of the fuel nozzle fuel nozzle according to aspects of the present disclosure.

Referring now to FIG. 6-7, perspective views of embodiments of the fuel nozzle 100 shown and described in regard to FIGS. 2-5 are generally provided. FIGS. 6-7 further depict a groove 234 through the first radial wall 134. The groove 234 defined into the first radial wall 134, and/or positioning the fuel-air outlet opening 126 into a recess or trough in the groove 234, may desirably mitigate flameholding and/or improve heat transfer to the centerbody 130 such as to reduce a thermal gradient at the centerbody 130 relative to a combustion chamber downstream of the fuel-air outlet opening 126. The groove 234 protrudes into the first radial wall 134 toward the upstream direction (i.e., toward the upstream end 99) relative to the fuel nozzle 100 such as to define a volume at the combustion chamber (i.e., channels at the first radial wall 134) at which a flammable first fuel-air mixture egressed from the fuel injectors 120 may reside such as to provide a source of ignition for a second fuel-air mixture egressing the fuel injectors 120 following the first fuel-air mixture.

In one embodiment, such as depicted in FIGS. 6-7, the groove 234 is extended into the first radial wall 134 circumferentially relative to the fuel nozzle centerline axis 112. In various embodiments, the fuel-air outlet opening 126 is defined at the groove 234 such that the fuel-air outlet opening 126 is recessed into the first radial wall 134. For example, the fuel-air outlet opening 126 is disposed within the groove 234. In one embodiment, the fuel-air outlet opening 126 may be disposed within a trough of the groove 234 such as to dispose the opening 126 further upstream relative to a relatively flat face of the first radial wall 134.

Referring still to FIGS. 6-7, in various embodiments, the plurality of fuel-air outlet openings 126 associated with each second fuel injector 222 is particularly disposed within the groove 234. In another embodiment, the fuel-air outlet opening 126 associated with the first fuel injector 221 is disposed within the groove 234, such as to dispose the fuel-air outlet opening 126 at the first fuel injector 221 in a trough or relatively upstream of a flat face of the first radial wall 134.

Referring to FIG. 8, in another embodiment of the fuel nozzle 100 shown and described in regard to FIGS. 1-7, the groove 234 is further extended into the first radial wall 134 at least partially along the radial direction extended from the fuel nozzle centerline 112. FIG. 8 depicts the groove 234 as extended at least partially along circumferentially relative to the fuel nozzle centerline 112, such as around the first fuel injector 221 and/or between circumferentially adjacent second fuel injectors 222. The groove 234 further extends radially from the fuel nozzle centerline axis 112 from the first fuel injector 221 to one or more of the second fuel injectors 222.

Referring now to FIGS. 9-10, further embodiments of a portion of the fuel nozzle 100 are provided. In one embodiment, such as depicted in regard to FIG. 10, the fuel nozzle 100 includes at least two fuel injectors 120 disposed at a non-parallel angle relative to one another. For example, referring to embodiments generally depicted in regard to FIGS. 2-8, at least two of the fuel injectors 120 may be disposed substantially parallel to one another relative to the longitudinal direction L.

In another embodiment, such as depicted in regard to FIGS. 9-10, two or more fuel injectors 120 converge to a single fuel-air outlet opening 126 at the first radial wall 134 such as to further desirably improve heat release characteristics and/or mitigate undesired flameholding. Each fuel injector 120 may define a reference fuel injector centerline axis 212, such as depicted in FIG. 10. Each fuel injector 120 (e.g., the second fuel injector 222) is extended such as to dispose each fuel injector centerline 212 of each fuel injector 120 at a non-parallel angle relative to one another. For example, each fuel injector centerline 212 intersects one another when extended along the longitudinal direction L.

Embodiments of the fuel nozzle 100 including the radially opposing radially oriented air inlet ports and one or more of the fuel injection ports defined radially therebetween may improve mixing of fuel and air at the mixing passages, such as via shearing the flow of air with the flow fuel substantially longitudinally exiting the fuel injection ports. The improved mixing of fuel and air, in addition to the concentric arrangement of fuel air mixing passage 115, or additionally the hydraulic diameter, may provide desirably shorter, more compact, flames at the combustion chamber 62 such as described herein.

The fuel nozzle 100 and combustor assembly 50 shown in FIGS. 1-10 and described herein may be constructed as an assembly of various components that are mechanically joined or arranged such as to produce the fuel nozzle 100 shown and described herein. The fuel nozzle 100 may alternatively be constructed as a single, unitary component and manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or mechanical fasteners, or any combination thereof, may be utilized to construct the fuel nozzle 100 or the combustor assembly 50. Furthermore, the fuel nozzle 100 may be constructed of any suitable material for turbine engine combustor sections, including but not limited to, nickel- and cobalt-based alloys. Still further, flowpath surfaces may include surface finishing or other manufacturing methods to reduce drag or otherwise promote fluid flow, such as, but not limited to, tumble finishing, barreling, rifling, polishing, or coating.

Various embodiments of the fuel nozzle 100 may define an inner plurality or cluster of fuel injectors 120 as a pilot burner such as to stabilize a surrounding main burner defined by first fuel air mixing passage 115. During operation of the engine 10, approximately 10% to approximately 40% of air (or oxidizer generally) may flow through the plurality of fuel injectors 120. Approximately 60% to approximately 90% of air may flow through the first fuel air mixing passage 115. A portion of air (e.g., a minimal portion defining the approximate amount not consumed by the fuel injectors 120 and the first fuel air mixing passage 115) may flow through the plenum 138 to the fuel air mixing passage 115 as a cooling fluid at the first radial wall 134, such as to improve fuel nozzle durability and performance.

It should be appreciated that one or more of the plurality of fuel injectors 120 may be defined differently relative to one another, such as to provide different fuel-air mixing ratios, different areas or volumes, flow rates, etc., to beneficially adjust heat release characteristics, blow-out margin, and overall emissions and stability performance, and energy output.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel nozzle for a gas turbine engine, the fuel nozzle comprising:

an outer sleeve extended circumferentially around a fuel nozzle centerline and extended along a longitudinal direction co-directional to the fuel nozzle centerline, wherein the outer sleeve defines a plurality of first radially oriented air inlet ports through the outer sleeve in circumferential arrangement relative to the fuel nozzle centerline;

a centerbody positioned radially inward of the outer sleeve, the centerbody comprising a centerbody outer annular wall extended circumferentially around the fuel nozzle centerline and extended along the longitudinal direction co-directional to the fuel nozzle centerline, wherein the centerbody further comprises a first radial wall extended from a downstream end of the centerbody outer annular wall, and further wherein the centerbody defines a plenum radially inward of the centerbody, and wherein the centerbody outer annular wall and the outer sleeve together define a first fuel air mixing passage extended along the longitudinal direction therebetween; and a fuel injector disposed in the plenum, wherein the fuel injector comprises a tubular outer wall extended co-directional to the fuel nozzle centerline, wherein the first radial wall of the centerbody extends orthogonally relative to the fuel nozzle centerline from the downstream end of the centerbody outer wall to the tubular outer wall, wherein the tubular outer wall defines a second fuel air mixing passage therewithin, and wherein the tubular outer wall extends to the first radial wall of the centerbody.

2. The fuel nozzle of claim 1, wherein the first fuel air mixing passage is extended circumferentially around the fuel nozzle centerline between the outer sleeve and the centerbody outer annular wall.

3. The fuel nozzle of claim 1, wherein the fuel injector is one of a plurality of fuel injectors disposed in the plenum, wherein each of the plurality of fuel injectors defines a respective second fuel air mixing passage extended co-directional to the fuel nozzle centerline and extended through the first radial wall of the centerbody.

4. The fuel nozzle of claim 1, wherein the fuel injector is disposed concentric to the fuel nozzle centerline.

5. The fuel nozzle of claim 1, wherein the fuel injector is one of a plurality of fuel injectors, the plurality of fuel injectors disposed in the plenum in circumferential arrangement relative to the fuel nozzle centerline.

6. The fuel nozzle of claim 5, wherein two or more of the plurality of fuel injectors converge to form a single fuel-air outlet opening through the first radial wall of the centerbody.

7. The fuel nozzle of claim 6, wherein the two or more fuel injectors each comprise a reference fuel injector centerline, and each fuel injector of the two or more fuel injectors is extended such as to dispose each respective fuel injector centerline of each of the two or more fuel injectors at a non-parallel angle relative to one another.

8. The fuel nozzle of claim 1, wherein the fuel nozzle defines a groove through the first radial wall of the centerbody, wherein the groove protrudes into the first radial wall of the centerbody toward an upstream direction relative to the fuel nozzle.

9. The fuel nozzle of claim 8, wherein the groove is extended into the first radial wall of the centerbody circumferentially relative to an axis of the fuel nozzle centerline.

10. The fuel nozzle of claim 8, wherein the groove is extended into the first radial wall of the centerbody at least partially along a radial direction extended from the fuel nozzle centerline.

11. The fuel nozzle of claim 8, wherein a fuel-air outlet opening is defined at the groove such that the fuel-air outlet opening is recessed into the first radial wall of the centerbody.

12. The fuel nozzle of claim 1, further comprising:
an end wall positioned at an upstream end of the fuel nozzle, wherein the end wall is coupled to the outer sleeve, and wherein the end wall defines a first fuel injection port in fluid communication with the first fuel air mixing passage, wherein the end wall is configured to provide a flow of fuel to the first fuel air mixing passage via the first fuel injection port.

13. The fuel nozzle of claim 12, wherein the plurality of first radially oriented air inlet ports are defined directly radially outward of a first fuel injection exit opening defined at the first fuel injection port in direct fluid communication with the first fuel air mixing passage.

14. The fuel nozzle of claim 1, wherein the fuel injector defines a fuel injection port in fluid communication with the second fuel air mixing passage, wherein the fuel injector is configured to provide a flow of fuel to the second fuel air mixing passage via the fuel injection port.

15. The fuel nozzle of claim 14, further comprising a plurality of second radially oriented air inlet ports through the tubular outer wall, the plurality of second radially oriented air inlet ports defined directly radially outward of a fuel injection exit opening defined at the fuel injection port in direct fluid communication with the second fuel air mixing passage.

16. The fuel nozzle of claim 14, wherein the fuel injection port is extended substantially along the longitudinal direction.

17. The fuel nozzle of claim 1, wherein the centerbody further comprises an inner annular wall radially inward of the centerbody outer annular wall, and a second radial wall upstream of the first radial wall and extended from a downstream end of the inner annular wall to the tubular outer wall of the fuel injector, the outer annular wall of the centerbody, the inner annular wall of the centerbody, the first radial wall and the second radial wall together defining a cavity therebetween.

18. The fuel nozzle of claim 17, wherein the second radial wall defines a radial wall opening therethrough providing fluid communication between the plenum and the cavity.

19. The fuel nozzle of claim 17, wherein the inner annular wall defines an annular wall opening therethrough providing fluid communication between the cavity and first fuel air mixing passage.

20. A gas turbine engine, the gas turbine engine comprising:
a combustion section comprising a combustor assembly defining a combustion chamber, and wherein the combustion section further comprises the fuel nozzle of claim 1 disposed adjacent to the combustion chamber configured to provide a flow of fuel to the combustion chamber.

21. A fuel nozzle for a gas turbine engine, the fuel nozzle comprising:
an outer sleeve extended circumferentially around a fuel nozzle centerline and extended along a longitudinal direction co-directional to the fuel nozzle centerline, wherein the outer sleeve defines a plurality of first radially oriented air inlet ports through the outer sleeve in circumferential arrangement relative to the fuel nozzle centerline;
a centerbody positioned radially inward of the outer sleeve, the centerbody comprising a centerbody outer annular wall extended circumferentially around the fuel nozzle centerline and extended along the longitudinal direction co-directional to the fuel nozzle centerline, wherein the centerbody further comprises a first radial wall extended from a downstream end of the centerbody outer annular wall, and further wherein the centerbody defines a plenum radially inward of the centerbody, and wherein the centerbody outer annular wall and the outer sleeve together define a first fuel air mixing passage extended along the longitudinal direction therebetween; and
a plurality of fuel injectors disposed in the plenum, wherein each of the plurality of fuel injectors comprises a respective tubular outer wall extended co-directional to the fuel nozzle centerline, wherein each tubular outer wall defines a respective second fuel air mixing passage therewithin, and wherein each tubular outer wall extends to the first radial wall of the centerbody,
wherein each second fuel air mixing passage extends co-directional to the fuel nozzle centerline and extends through the first radial wall of the centerbody.

22. A fuel nozzle for a gas turbine engine, the fuel nozzle comprising:
an outer sleeve extended circumferentially around a fuel nozzle centerline and extended along a longitudinal direction co-directional to the fuel nozzle centerline, wherein the outer sleeve defines a plurality of first radially oriented air inlet ports through the outer sleeve in circumferential arrangement relative to the fuel nozzle centerline;
a centerbody positioned radially inward of the outer sleeve, the centerbody comprising a centerbody outer annular wall extended circumferentially around the fuel nozzle centerline and extended along the longitudinal direction co-directional to the fuel nozzle centerline, wherein the centerbody further comprises a first radial wall extended from a downstream end of the centerbody outer annular wall, and further wherein the centerbody defines a plenum radially inward of the centerbody, and wherein the centerbody outer annular wall and the outer sleeve together define a first fuel air mixing passage extended along the longitudinal direction therebetween;
a fuel injector disposed in the plenum, wherein the fuel injector comprises a tubular outer wall extended co-directional to the fuel nozzle centerline, wherein the tubular outer wall defines a second fuel air mixing passage therewithin, and wherein tubular outer wall extends to the first radial wall of the centerbody; and
an end wall positioned at an upstream end of the fuel nozzle, wherein the end wall is coupled to the outer sleeve, and wherein the end wall defines a first fuel injection port in fluid communication with the first fuel air mixing passage, wherein the end wall is configured to provide a flow of fuel to the first fuel air mixing passage via the first fuel injection port.

\* \* \* \* \*